(12) United States Patent
Shen et al.

(10) Patent No.: US 8,600,109 B2
(45) Date of Patent: Dec. 3, 2013

(54) IMAGE OBJECT TRACKING USING A PARTICLE FILTER

(75) Inventors: Chun-Fu Shen, New Taipei (TW);
Der-Chun Cherng, New Taipei (TW);
Sheng-Yan Yang, New Taipei (TW);
Yan-Chen Lu, New Taipei (TW)

(73) Assignee: Vatics Inc., New Taipei (TW)

( * ) Notice: Subject to any disclaimer, the term of this patent is extended or adjusted under 35 U.S.C. 154(b) by 126 days.

(21) Appl. No.: 13/296,654

(22) Filed: Nov. 15, 2011

(65) Prior Publication Data

US 2013/0044911 A1 Feb. 21, 2013

(30) Foreign Application Priority Data

Aug. 19, 2011 (TW) .............................. 100129844 A (51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

2007/0100916 A1* 5/2007 Konecny et al. .............. 707/205
2011/0231016 A1* 9/2011 Goulding ...................... 700/246

OTHER PUBLICATIONS

Ka Ki Ng ; Edward J. Delp; New models for real-time tracking using particle filtering. Proc. SPIE 7257, Visual Communications and Image Processing 2009, 72570B (Jan. 19, 2009); doi:10.1117/12.807311.*

Cherng, et al., "Real Time Color Based Particle Filtering for Object Tracking with Dual Cache Architecture", 8th IEEE International Conference on AVSS, (Aug. 30, 2011), pp. 148-153.

* cited by examiner

*Primary Examiner* — Nirav G Patel
(74) *Attorney, Agent, or Firm* — Muncy, Geissler, Olds & Lowe, PLLC (57) ABSTRACT

A particle filter is suitable for performing particle filtering on a frame to track a particular object in the frame. The particle filter includes a frame cache, an observation model generator, and a particle filter controller. The frame cache is connected to a system memory through a system bus, in which the system memory stores all image blocks of the frame; and the frame cache obtains the at least one image block of the frame from the system memory and stores the obtained image block. The observation model generator reads at least one pixel from the frame cache, and generates an observation model corresponding to the object and the read image block according to the read pixel. The particle filter controller obtains the observation model from the observation model generator, and determines and outputs an object tracking result of the object according to the observation model.

22 Claims, 5 Drawing Sheets

IMAGE OBJECT TRACKING USING A PARTICLE FILTER

CROSS-REFERENCE TO RELATED APPLICATIONS

This non-provisional application claims priority under 35 U.S.C. §119(a) on Patent Application No(s). 100129844 filed in Taiwan, R.O.C. on Aug. 19, 2011, the entire contents of which are hereby incorporated by reference.

BACKGROUND

1. Technical Field

The disclosure relates to a particle filter, and more particularly to a particular filter applied to object tracking.

2. Related Art

Usually, object tracking refers to a technique of identifying one or more objects in an image or a series of images (including a video sequence) based on different purposes. The above-mentioned tracking refers to estimation for dynamic objects. The object tracking may be applied to security, surveillance, and human resources, fabrication, or production management. Taking a surveillance system for monitoring a bank vault as an example, it is necessary to detect whether an object enters the vault, and continuously track and record the movement of the object. In another example, the object tracking may be used in a radar capable of detecting moving objects in the air to determine whether an enemy aircraft or a missile comes.

Conventionally, a particle filter may be used for performing the object tracking. The particle filter establishes an observation model according to a certain characteristic of the object, sets multiple candidates on the image, and sets a window of each of the candidates. Next, the particle filter calculates the observation model of each of the windows, and compares the observation models to estimate the movement of the object. However, when performing the object tracking, the particle filter needs to continuously access a system memory storing the image to read content of each of the windows, a great amount of system bus bandwidth is occupied and consumed. In addition, the time required for reading the system memory is longer, which results in poor processing efficiency of the particle filter.

Furthermore, with great increase of the resolution of the image to be processed or increase of the number of the objects to be tracked, the problems that a great amount of reading and writing bandwidth of the system bus is occupied and the processing efficiency is low become even worse.

SUMMARY

The disclosure is a particle filter, applied to perform particle filtering on a frame, for tracking an object in the frame, in which the frame has multiple image blocks.

According to an embodiment, the particle filter includes a frame cache, an observation model generator, and a particle filter controller. The frame cache is connected to a system memory through a system bus. The system memory stores all the image blocks of the frame, and the frame cache obtains from the system memory and stores at least one image block of the frame. The observation model generator is connected to the frame cache. The observation model generator reads at least one pixel from the frame cache, and generates an observation model corresponding to the object and the read pixel according to the read pixel. The particle filter controller is connected to the observation model generator. The particle filter controller obtains the observation model from the observation model generator, and determines and outputs an object tracking result of the object according to the observation model.

According to another embodiment, the particle filter further includes an observation model cache. Each of the image blocks includes multiple pixels, the observation model includes multiple corresponding feature indexes and multiple corresponding feature values, and each of the pixels is corresponding to a group of the feature index and the feature value. The observation model cache is connected to the frame cache and the observation model generator, so that the observation model cache reads the pixels of the at least one image block from the frame cache. The observation model cache is used for storing the feature indexes and the feature values corresponding to the read pixels, so the observation model cache enables the observation model generator to generate the observation model corresponding to the read pixels.

According to further another embodiment, the particle filter may only have the observation model cache, and does not have the frame cache. In this embodiment, the observation model generator is connected to the system memory through the system bus to read at least one image block of the frame from the system memory. The frame cache or the observation model cache may lower demands of the particle filter for reading and writing the system memory, so the use of the frame cache or the observation model cache greatly reduces the required reading bandwidth and the required operation cycles. The observation model cache may accelerate the speed of generating the observation model, and improve the operation efficiency of the particle filter.

BRIEF DESCRIPTION OF THE DRAWINGS

The disclosure will become more fully understood from the detailed description given herein below for illustration only, and thus are not limitative of the present disclosure, and wherein.

DETAILED DESCRIPTION

The detailed features and advantages of the disclosure are described below in great detail through the following embodiments, and the content of the detailed description is sufficient for persons skilled in the art to understand the technical content of the disclosure and to implement the disclosure there accordingly. Based upon the content of the specification, the claims, and the drawings, persons skilled in the art can easily understand the relevant objectives and advantages of the disclosure.

The disclosure is a particle filter, applied to track a visual object. The particle filter may be used for performing particle filtering on a frame in the video to track the object in the frame. The frame has multiple image blocks, and each of the image blocks has multiple pixels.

Figure 1:
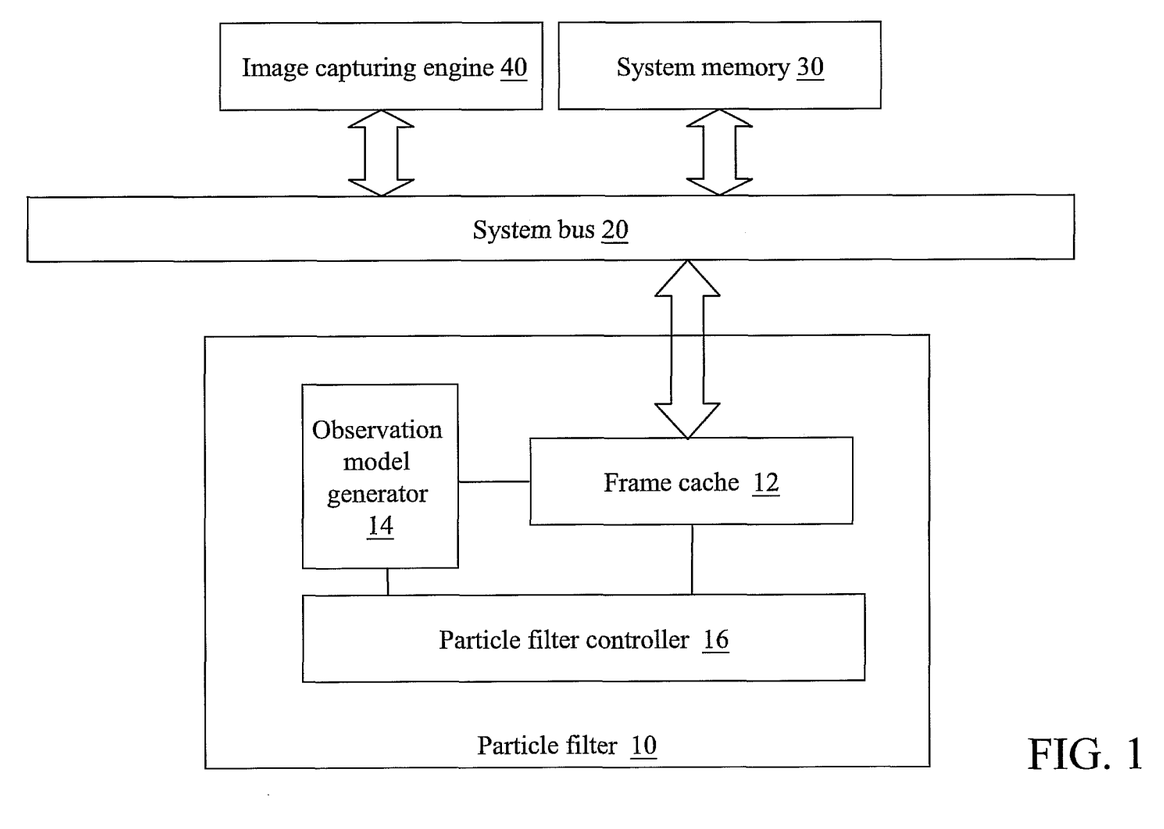
FIG. 1 is a schematic block diagram of a particle filter according to an embodiment.

Referring to FIG. 1, FIG. 1 is a schematic block diagram of a particle filter according to an embodiment.

In the embodiment of FIG. 1, the particle filter 10 includes a frame cache 12, an observation model generator 14, and a particle filter controller 16. The particle filter 10 may be connected to a system bus 20 to receive a frame to be processed from a system memory 30. An image capturing engine 40 may be connected to an image sensor (not shown) to capture a frame of a video to be processed, and the image capturing engine 40 may store the frame of the video in the system memory 30 through the system bus 20. In addition, the system memory 30 stores all the image blocks of the frame to be processed. However, the source of the frame is not limited thereto.

Figure 2:
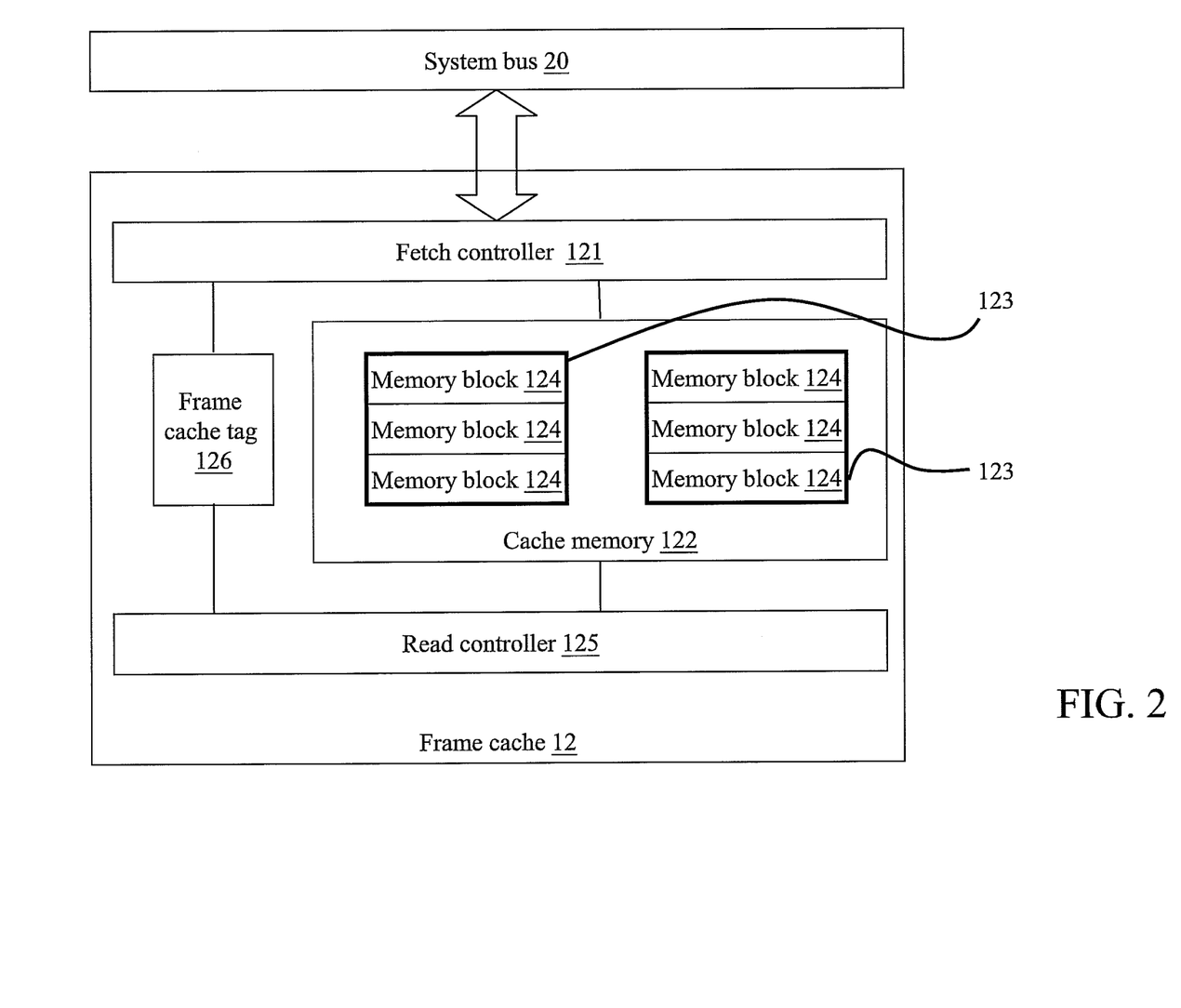
FIG. 2 is a schematic block diagram of a frame cache according to an embodiment.

The frame cache 12 is connected to the system memory 30 through the system bus 20, and the frame cache 12 obtains at least one image block of the frame from the system memory 30 and stores the at least one image block, so the observation model generator 14 and the particle filter controller 16 may perform the particle filtering on the at least one image block of the frame in the frame cache 12. FIG. 2 is a schematic block diagram of a frame cache according to an embodiment. As shown in FIG. 2, more specifically, the frame cache 12 may include a fetch controller 121, a cache memory 122, a read controller 125, and a frame cache tag 126.

The fetch controller 121 is connected to the system bus 20. According to a cache hit or a cache miss state of the read controller 125, the fetch controller 121 fetches at least one image block from the system memory 30. The cache memory 122 may include at least one memory bank 123, and the image block fetched from the system memory 30 is actually stored in the memory bank 123. In addition, the memory bank 123 may be partitioned into multiple memory blocks 124 according to the sizes of the image blocks. For example, if the frame is partitioned into the image blocks of 16×16 pixels, each of the memory blocks 124 may store data of 16×16 pixels.

The read controller 125 may be connected to the observation model generator 14, so the observation model generator 14 reads the image block stored in the cache memory 122 through the read controller 125. The frame cache tag 126 records address information of the image block stored in the cache memory 122 relative to the frame. For example, the frame cache tag 126 may record a starting location or an identification code of the stored image block in the frame.

The observation model generator 14 is connected to the frame cache 12, so the observation model generator 14 may read the at least one image block from the frame cache 12. The observation model generator 14 generates an observation model corresponding to the object and the read image block according to the read image block. The particle filter controller 16 is connected to the observation model generator 14, and may be connected to the frame cache 12. The particle filter controller 16 obtains the observation model from the observation model generator 14, and determines and outputs an object tracking result of the object being tracked according to the observation model.

More specifically, the particle filter controller 16 may generate multiple candidates for the object being tracked, and may set multiple windows according to the candidates. Each of the windows includes multiple pixels, and the pixels of the window are included by the at least one image block. In other words, in order to obtain all the pixels of the one specific window, the at least one or more image blocks need to be read. From the perspective of the image block, the one image block may not contain any window, or the one image block at least includes a part of the pixels of a window. The observation model generator 14 generates the multiple observation models in a one-to-one corresponding manner according to the windows. When the window has the multiple image blocks, the multiple image blocks of the same window correspond to the same observation model. The particle filter controller 16 compares the observation models of the windows, and selects one of the candidates as the object tracking result.

For example, the observation model may be a histogram, a co-occurrence matrix, a color mixture model, or a gradient histogram, respectively representing different image features of the image blocks of the window. The particle filter controller 16 may first calculate the observation model of the object, and then compare the observation model of the object and the observation models of all the candidates. The particle filter controller 16 may determine the observation model of which candidate is the closest to the observation model of the object, and then take the candidate having the closest observation model as the object tracking result.

When the observation model generator 14 needs to read the image block, the particle filter controller 16 sends a reading instruction to the frame cache 12. After receiving the reading instruction, the read controller 125 determines whether the required image block currently exists in any of the memory block 124 according to the frame cache tag 126. If the answer is yes, the read controller 125 directly reads the required image block from the memory block 124 and transmits back the required image block without using the system bus 20 and the system memory 30. In this manner, the observation model generator 14 may directly obtain the required image block from the frame cache 12, so the implementation of this manner may greatly reduce reading and writing bandwidth of the system bus, and improve the efficiency of reading the image block. Although positions of the candidates are randomly selected, the positions are selected based on the same object. In this way, the contents of the windows are associated and the frame cache 12 is enabled to maintain a certain hit rate.

Due to the limited capacity of the cache memory 122, the cache memory 122 may not have the image block required by the observation model generator 14. When the cache memory 122 does not have the image block required by the observation model generator 14, the fetch controller 121 fetches the required image block from the system memory 30. The cache memory 122 may search for the empty memory block 124, or clear, e.g., the memory block 124 maintained for the longest time or read for the fewest times, and store the latest fetched image block. Finally, the read controller 125 provides the required image block for the observation model generator 14.

In addition, in order to improve the processing efficiency of the particle filter 10, a format conversion process may be performed on the frame stored in the system memory 30. Therefore, the multiple pixel codes of each of the image blocks in the frame are stored in the successive positions of the memory.

Usually, when the image is read and stored, a sequence of raster scan is used. That is to say, the pixels of one image are scanned from left to right and from top to bottom and then stored in the memory. If the image is represented by the YUV420 color space, the luminance value and the chrominance value of the pixel are separately stored. The pixel codes are codes obtained after encoding parameters representing the pixel, e.g., the luminance value, the chrominance value, or an RGB value of the pixel. Taking the image block of 16×16 pixels as an example, the image block crosses 16 rows in the frame, so conventionally 16 system bus requests are required to read the luminance value of the pixels on each row, and then 8 system bus requests are required to read the chrominance value of the pixels on each row.

Figure 3:
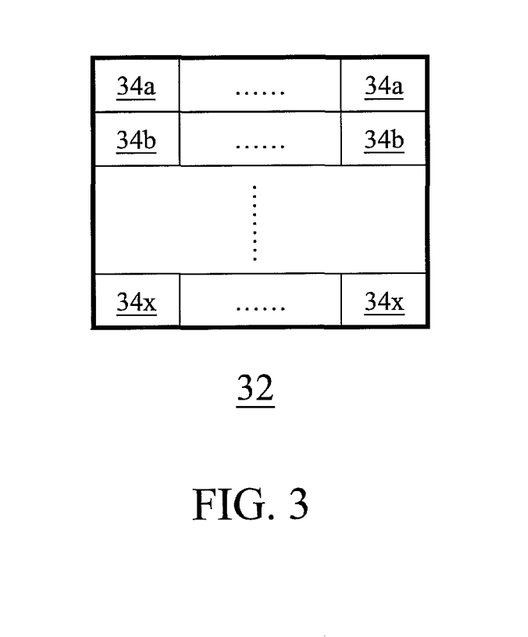
FIG. 3 is a schematic block diagram of a bit stream according to an embodiment.

FIG. 3 is a schematic block diagram of a bit stream according to an embodiment. As shown in FIG. 3, in order to improve the processing efficiency, all the pixel codes (e.g., including the luminance value and the chrominance value) of the same image block may be successively stored in advance. The system memory 30 may include multiple memory units 32. The multiple pixel codes 34a, 34b, and 34x are respectively corresponding to different image blocks, the multiple pixel codes 34a are successively stored in the memory unit 32, and the multiple of pixel codes 34b and 34x are also successively stored. In this manner, the frame cache 12 may successively fetch all the pixel codes 34a, 34b, or 34x corresponding to the same image block from the system memory 30 in the single system bus request.

Figure 4:
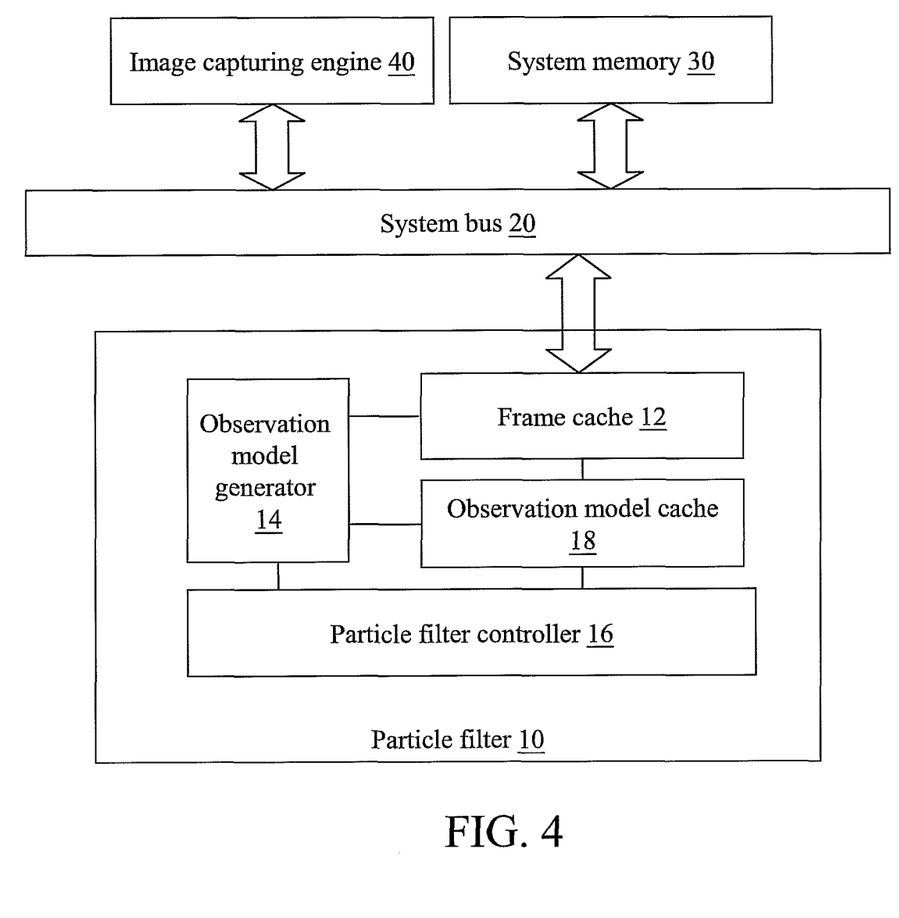
FIG. 4 is a schematic block diagram of a particle filter according to another embodiment.

Next, referring to FIG. 4, FIG. 4 is a schematic block diagram of a particle filter according to another embodiment.

In order to improve performances, the particle filter 10 further includes an observation model cache 18, for assisting the observation model generator 14 in performing a parallel processing on the multiple pixels at one time. Each of the observation models generated by the observation model generator 14 includes multiple corresponding feature indexes and multiple corresponding feature values, and each of the pixels is corresponding to at least one group of the feature index and the feature value. The observation model generator 14 determines the corresponding feature index according to each of the pixels of the window, and accumulates the feature values accordingly. The observation model cache 18 may be connected to the frame cache 12 and the observation model generator 14, so as to read the multiple pixels of at least one image block from the frame cache 12. The observation model cache 18 is used for storing the feature indexes and the feature values corresponding to the read pixels, so the observation model cache 18 enables the observation model generator 14 to generate the observation model corresponding to the read pixels. In addition, the observation model cache 18 may also be connected to the particle filter controller 16.

Figure 5:
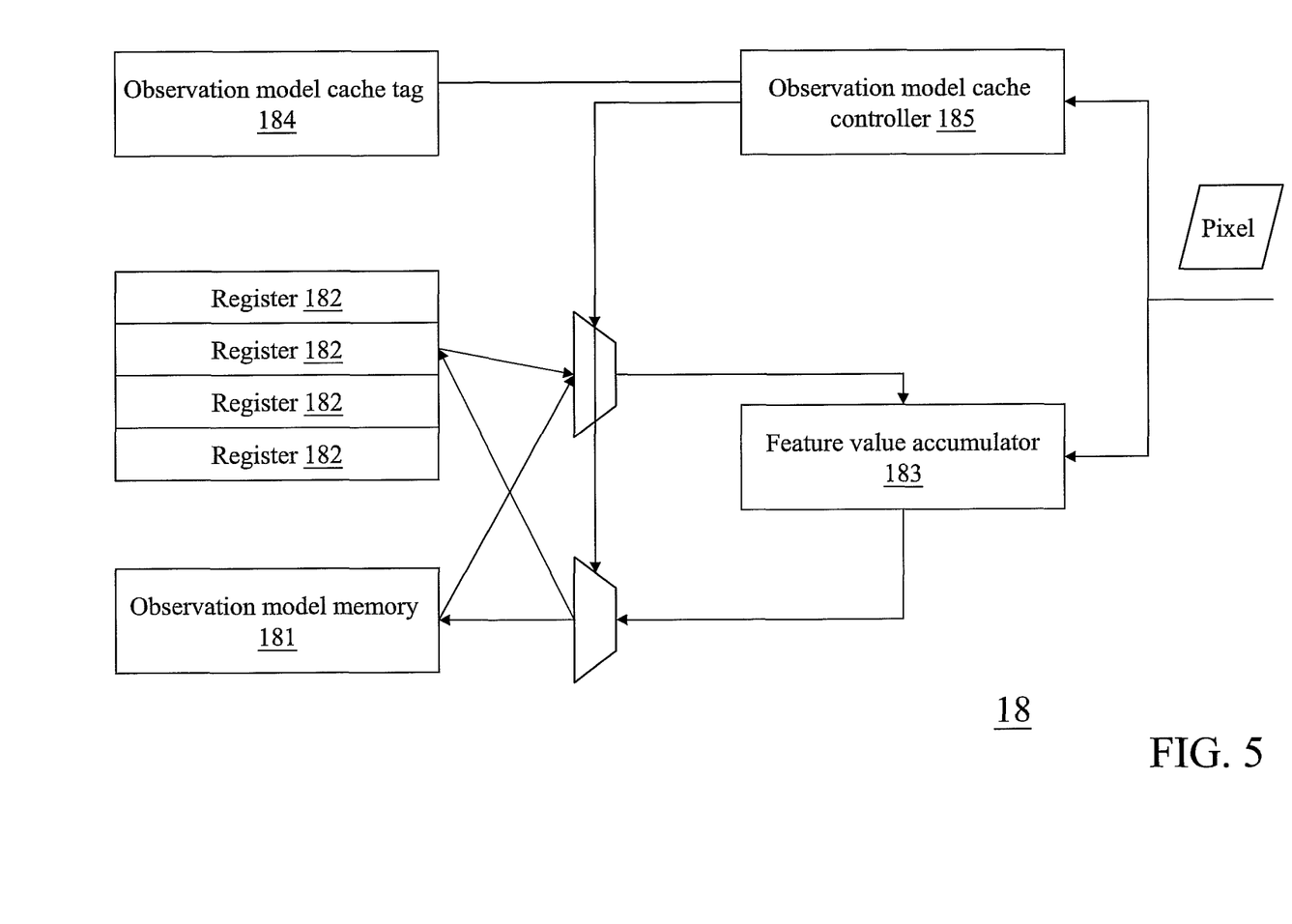
FIG. 5 is a schematic block diagram of an observation model cache according to an embodiment.

The observation model cache 18 may temporarily store at least one group of the feature index and the feature value, so the observation model generator 14 may access the group of the feature index and the feature value. FIG. 5 is a schematic block diagram of an observation model cache according to an embodiment. Referring to FIG. 5, the observation model cache 18 includes an observation model memory 181, multiple registers 182, and a feature value accumulator 183. The observation model memory may be a static random access memory (SRAM), but is not limited to it thereto.

The observation model memory 181 may store all the feature indexes and feature values of the observation model being generated, and each of the registers 182 are used for storing the feature value corresponding to one of the feature indexes. The feature value accumulator 183 may read the multiple pixels at one time from the frame cache 12, and may read the feature values of the feature indexes corresponding to the pixels from the at least one register 182 or the observation model memory 181. The feature value accumulator 183 accumulates the read feature values according to the read pixels, and stores the feature values back to the register 182. In addition, the multiple registers 182 is not associated and may respectively perform reading and writing at the same time, such that the feature value accumulator 183 may perform reading or writing on the multiple registers 182 at the same time. In other words, when the observation model is generated, the feature value accumulator 183 may process multiple pixels in parallel.

Moreover, the observation model cache 18 further includes an observation model cache tag 184 and an observation model cache controller 185. The observation model cache tag 184 may record all the feature indexes corresponding to the registers 182. According to the observation model cache tag 184, the observation model cache controller 185 determines whether each of the feature values required by the feature value accumulator 183 is stored in one of the registers 182. If there is any one of the register 182 stores the required feature value, the observation model cache controller 185 may enable the feature value accumulator 183 to read the required feature values from the corresponding register 182, and store the accumulated feature values back to the corresponding register 182. On the contrary, the observation model cache controller 185 enables the feature value accumulator 183 to read the required feature values from the observation model memory 181. Then, the observation model cache 18 may search for the empty register 182, or clear, e.g., the register 182 maintained for the longest time or read for the fewest times. Finally, the accumulated feature values are stored in the cleared register 182.

Practically, during writing and reading of the feature values, the feature value accumulator 183 is connected to the observation model memory 181 and the register 182 through two multiplexers, and controls the multiplexers through the observation model cache controller 185 to read and write the feature values. The feature value accumulator 183 includes several accumulating units, and the accumulating units are used for accumulating the different feature values at the same time.

When the observation model generator 14 completes generating the observation model of the one window, the observation model memory 181 and all the registers 182 may be cleaned up to prepare for generating the observation model of the next window.

According to different characteristics of the object or the frame, the particle filter controller 16 may enable the observation model generator 14 to generate a histogram, a co-occurrence matrix, a color mixture model, a gradient histogram, or other different observation models.

For example, the histogram is used as the observation model, and the observation model generator 14 may generate the histogram of each of the windows. The histogram represents the luminance distribution of the pixels in the window; such that the feature indexes are multiple luminance values, and the feature values are multiple pixel counts corresponding to the luminance values. When the histogram of one of the windows is generated, the observation model cache 18 may read four pixels of the window from the frame cache 12 at the same time, and the observation model cache controller 185 determines the luminance values of the four pixels. Next, the observation model cache controller 185 searches for the observation model cache tag 184 by taking the 4 luminance values as the feature index, so as to determine whether the register 182 is corresponding to the luminance value to be processed. If the answer is yes, the feature values are obtained from the register 182, and the feature values are accumulated by 1 and then stored back. If the answer is no, the feature values are obtained from the observation model memory 181, and the feature values are accumulated by 1 and then stored in the appropriate register 182.

In addition, the feature value accumulator 183 may first determine whether the multiple pixels are corresponding to the same feature index at the same time. For example, when the luminance values of the first read pixel and the second read pixel are 100, and one of the registers 182 is just corresponding to the luminance value 100, the feature value accumulator 183 reads the register 182 corresponding to the luminance value 100, and accumulates the feature values by 2 and stores the feature values back.

Similarly, the particle filter controller 16 may enable the observation model generator 14 to generate the co-occurrence matrix of each of the windows as the observation model. The co-occurrence matrix represents the texture distribution of the object. When the observation model is the co-occurrence matrix, multiple pixel co-occurrence relations may be used as the feature index, and multiple pixel co-occurrence times corresponding to the pixel co-occurrence relations are used as the feature values. The pixel co-occurrence relation represents the possible pattern when the multiple pixels occur at the same time, and the pixel co-occurrence times represents the occurring times of the patterns.

The particle filter controller 16 may also enable the observation model generator 14 to generate a color mixture model of each of the windows as the observation model. The color mixture model describes the mixture of color distribution of the object. When the observation model is the color mixture model, multiple pixels distributions corresponding to the pixels may be used as the feature indexes, and multiple parameters corresponding to the pixel distributions is used as the feature values.

The particle filter controller 16 may also enable the observation model generator 14 to generate the gradient histogram of each of the windows as the observation model, which represents the gradient distribution of the pixels in the window. When the observation model is the gradient histogram, multiple gradient values are used as the feature indexes, and multiple pixel counts corresponding to the gradient values are used as the feature values.

The observation model generator 14 and the observation model cache 18 process the pixels in the same window, such that the multiple pixels read and processed at one time are highly associated (for example, having similar luminance), and the observation model cache 18 is enabled to maintain a desirable hit rate.

Figure 6:
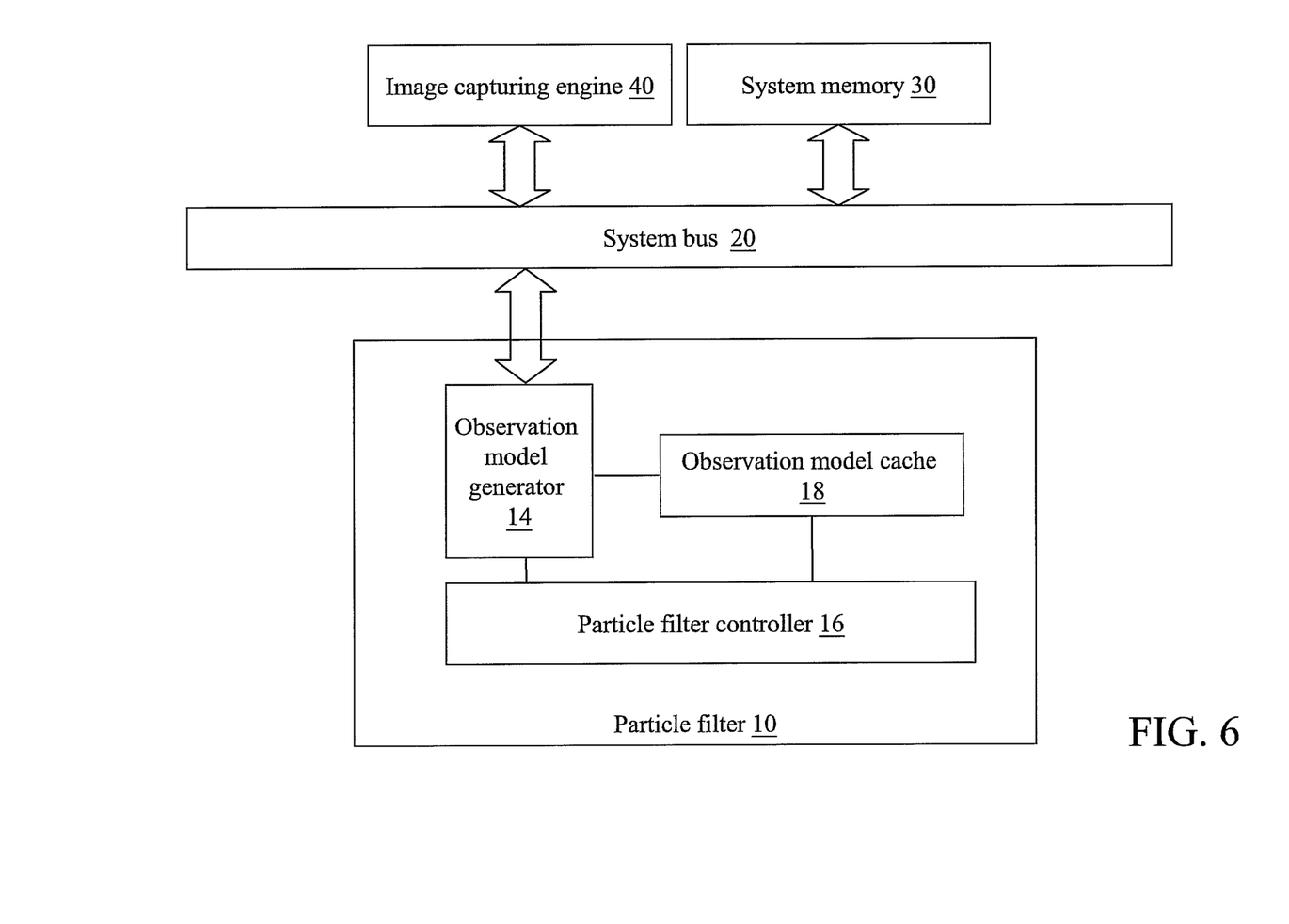
FIG. 6 is a schematic block diagram of a particle filter according to further another embodiment.

Referring to FIG. 6, FIG. 6 is a schematic block diagram of a particle filter according to further another embodiment. In this embodiment, the particle filter 10 does not have the frame cache 12 but has the observation model cache 18. It is different from the embodiment of FIG. 4 that the observation model generator 14 is directly connected to the system bus 20 so as to be connected to the system memory 30, and the observation model generator 14 may read the image blocks or the pixels of the frame from the system memory 30.

Table 1 in the following provides experiment data, in which four different video sequences are used for comparing the conventional particle filter without any cache with the particle filter 10 according to the embodiment of FIG. 4, in which a unit of the occupied reading and writing bandwidth of the system bus is MHz.

TABLE 1

| Sequence name | Reading and writing bandwidth of the conventional particle filter | Reading and writing bandwidth of the particle filter 10 according to the embodiment of FIG. 4 | Reduction rate of occupied bandwidth |
| --- | --- | --- | --- |
| Sequence 1 | 63.49 | 13.56 | 78.64% |
| Sequence 2 | 131.07 | 22.96 | 82.48% |
| Sequence 3 | 114.53 | 44.87 | 60.82% |
| Sequence 4 | 171.83 | 81.65 | 52.48% |

It may be known from Table 1 that the reading and writing bandwidth of the system bus occupied by the particle filter 10 according to the embodiment of FIG. 4 is at least lower than a half of the bandwidth required by the convention particle filter.

In Table 2 in the following, four video sequences are used for comparing the conventional particle filter without any cache with the particle filter 10 according to the embodiment of FIG. 4.

TABLE 2

| Sequence name | Operation cycle required by the conventional particle filter | Operation cycle required by the particle filter 10 according to the embodiment of FIG. 4 | Reduction rate of the required operation cycle |
| --- | --- | --- | --- |
| Sequence 1 | 217.47 | 85.55 | 60.66% |
| Sequence 2 | 434.94 | 119.40 | 72.55% |
| Sequence 3 | 434.94 | 211.96 | 51.27% |
| Sequence 4 | 652.41 | 324.03 | 50.33% |

It may be known from Table 2 that the operation cycle required by the particle filter 10 according to the embodiment of FIG. 4 is at most half the operation cycle required by the convention particle filter.

To sum up, the frame cache or the observation model cache may enable the reading and writing bandwidth and the operation cycle required by the particle filter to be greatly reduced. The observation model cache includes the multiple registers, so the particle filter may perform the parallel process on the multiple pixels to double the operation efficiency.

What is claimed is:

1. A particle filter, suitable for performing particle filtering on a frame, for tracking an object in the frame, wherein the frame has a plurality of image blocks, the particle filter comprising:
   a frame cache, connected to a system memory through a system bus, wherein the system memory stores all the image blocks of the frame, and the frame cache obtains a plurality of pixels of at least one image block of the frame from the system memory and stores the pixels the frame cache comprising:
      a fetch controller, connected to the system bus, for fetching at least one image block from the system memory;
      a cache memory, comprising at least one memory bank, wherein the memory bank stores the image block fetched from the system memory;
      a read controller, connected to the observation model generator and the particle filter controller, so as to enable the observation model generator or the particle filter controller to read the image block stored in the cache memory; and
      a frame cache tag, for recording address information of the image block stored in the cache memory relative to the frame;
   an observation model generator, connected to the frame cache, for reading the pixels of the at least one image block from the frame cache, and generating an observation model corresponding to the object and the read pixels according to the read pixels; and
   a particle filter controller, connected to the observation model generator, for obtaining the observation model from the observation model generator, and deciding and outputting an object tracking result of the object according to the observation model.

2. The particle filter according to claim 1, wherein the particle filter controller generates a plurality of candidates for the object, and sets a plurality of windows according to the candidates, each of the windows comprises a plurality of pixels, and the pixels of each of the windows are covered by at least one image block; the observation model generator generates the observation models according to the windows, and the particle filter controller compares the observation models of the windows and selects one of the candidates as the object tracking result.

3. The particle filter according to claim 1, wherein when the cache memory does not have the image block required by the observation model generator or the particle filter controller, the fetch controller fetches the required image block from the system memory, the cache memory stores the required image block, and the read controller provides the required image block for the observation model generator.

4. The particle filter according to claim 1, wherein the memory bank is partitioned into a plurality of memory blocks according to the sizes of the image blocks.

5. The particle filter according to claim 1, wherein in the system memory storing the frame, a plurality of pixel codes corresponding to the same image block is successively arranged, and the frame cache fetches all the pixel codes corresponding to the same image block from the system memory in a single system bus request.

6. The particle filter according to claim 1, wherein each of the image blocks comprises a plurality of pixels, the observation model comprises a plurality of corresponding feature indexes and a plurality of corresponding feature values, and each of the pixels is corresponding to at least one group of the feature index and the feature value, the particle filter further comprising:
 an observation model cache, connected to the frame cache and the observation model generator, for reading the pixels of the at least one image block from the frame cache, wherein the observation model cache is used for storing the feature indexes and the feature values corresponding to the read pixels, so the observation model cache enables the observation model generator to generate the observation model corresponding to the read pixels.

7. The particle filter according to claim 6, wherein the observation model cache comprises:
 an observation model memory, for storing the feature indexes and the feature values of the observation model;
 a plurality of registers, each for storing the feature value corresponding to one of the feature indexes; and
 a feature value accumulator, for reading the pixels from the frame cache, reading the feature values from the at least one register or the observation model memory, accumulating the read feature values according to features of the read pixels, and storing the feature values back to the registers.

8. The particle filter according to claim 7, wherein the observation model memory is a static random access memory (SRAM).

9. The particle filter according to claim 7, wherein the observation model is a histogram, the feature indexes are a plurality of luminance values, and the feature values are a plurality of pixel counts corresponding to the luminance values.

10. The particle filter according to claim 7, wherein the observation model is a co-occurrence matrix, the feature index are a plurality of pixel co-occurrence relations, and the feature values are a plurality of pixel co-occurrence times corresponding to the pixel co-occurrence relations.

11. The particle filter according to claim 7, wherein the observation model is a color mixture model, the feature indexes are a plurality of pixel distributions, and the feature values are a plurality of parameters corresponding to the pixel distributions.

12. The particle filter according to claim 7, wherein the observation model is a gradient histogram, the feature indexes are a plurality of gradient values, and the feature values are a plurality of pixel counts corresponding to the gradient values.

13. The particle filter according to claim 7, wherein the observation model cache further comprises:
 an observation model cache tag, for recording the feature indexes corresponding to the feature values stored in the registers; and
 an observation model cache controller, for determining whether each of the feature values required by the feature value accumulator is stored in one of the registers according to the observation model cache tag; if yes, enabling the feature value accumulator to read the required feature value from the corresponding register; and if not, enabling the feature value accumulator to read the required feature value from the observation model memory.

14. A particle filter, suitable for performing particle filtering on a frame, for tracking an object in the frame, wherein the frame has a plurality of image blocks, and each of the image blocks comprises a plurality of pixels, the particle filter comprising:
 an observation model generator, connected to a system memory through a system bus, for reading the at least one image block of the frame from the system memory, and generating an observation model corresponding to the object and the read image block according to the read image block, wherein the observation model comprises a plurality of corresponding feature indexes and a plurality of corresponding feature values, and each of the pixels is corresponding to at least one group of the feature index and the feature value;
 a particle filter controller, connected to the observation model generator, for obtaining the observation model from the observation model generator, and deciding and outputting an object tracking result of the object according to the observation model; and
 an observation model cache, connected to the observation model generator, for storing the feature indexes and the feature values corresponding to the read pixels, so the observation model cache enables the observation model generator to generate the observation model corresponding to the read pixels,
 wherein in the system memory storing the frame, a plurality of pixel codes corresponding to the same image block is successively arranged, and the observation model cache fetches all the pixel codes corresponding to the same image block from the system memory in a single system bus request.

15. The particle filter according to claim 14, wherein the particle filter controller generates a plurality of candidates for the object, and sets a plurality of windows according to the candidates, each of the windows comprises a plurality of pixels, and the pixels of each of the windows are covered by the at least one image block; the observation model generator generates the observation models according to the windows, and the particle filter controller compares the observation models of the windows and selects one of the candidates as the object tracking result.

16. The particle filter according to claim 14, wherein the observation model cache comprises:
 an observation model memory, for storing the feature indexes and the feature values of the observation model;

a plurality of registers, each for storing the feature value corresponding to one of the feature index; and a feature value accumulator, for reading the pixels from the system memory, reading the feature values from the at least one register or the observation model memory, accumulating the read feature values according to the read pixels, and storing the feature values back to the registers.

17. The particle filter according to claim 16, wherein the observation model memory is a static random access memory (SRAM).

18. The particle filter according to claim 16, wherein the observation model is a histogram, the feature indexes are a plurality of luminance values, and the feature values are a plurality of pixel counts corresponding to the luminance values.

19. The particle filter according to claim 16, wherein the observation model is a co-occurrence matrix, the feature indexes are a plurality of pixel co-occurrence relations, and the feature values are a plurality of pixel co-occurrence times corresponding to the pixel co-occurrence relations.

20. The particle filter according to claim 16, wherein the observation model is a color mixture model, the feature indexes are a plurality of pixel distributions, and the feature values are a plurality of parameters corresponding to the pixel distributions.

21. The particle filter according to claim 16, wherein the observation model is a gradient histogram, the feature indexes are a plurality of gradient values, and the feature values are a plurality of pixel counts corresponding to the gradient values.

22. The particle filter according to claim 16, wherein the observation model cache further comprises:

an observation model cache tag, for recording the feature indexes corresponding to the feature values stored in the registers; and an observation model cache controller, for determining whether each of the feature values required by the feature value accumulator is stored in one of the registers according to the observation model cache tag; if yes, enabling the feature value accumulator to read the required feature value from the corresponding register; and if not, enabling the feature value accumulator to read the required feature value from the observation model memory.

* * * * *